United States Patent
Ueda et al.

(10) Patent No.: US 7,313,318 B2
(45) Date of Patent: Dec. 25, 2007

(54) VIDEO SIGNAL ENCODING AND RECORDING APPARATUS WITH VARIABLE TRANSMISSION RATE

(75) Inventors: Motoharu Ueda, Yokosuka (JP); Kenji Sugiyama, Yokosuka (JP)

(73) Assignee: Victor Company of Japan, Limited, Yokohama (JP)

( * ) Notice: Subject to any disclaimer, the term of this patent is extended or adjusted under 35 U.S.C. 154(b) by 867 days.

(21) Appl. No.: 10/609,661

(22) Filed: Jul. 1, 2003

(65) Prior Publication Data

US 2004/0022316 A1 Feb. 5, 2004

Related U.S. Application Data (63) Continuation of application No. 09/325,551, filed on Jun. 4, 1999, now abandoned.

(30) Foreign Application Priority Data

| | | |
|---|---|---|
| Jun. 17, 1998 | (JP) | 10-170048 |
| Jul. 22, 1998 | (JP) | 10-206164 |

(51) Int. Cl.
H04N 5/917 (2006.01)

(52) U.S. Cl. ............... 386/109; 386/112; 386/125

(58) Field of Classification Search .......... 386/109, 386/110, 111, 112, 125–126; 375/240.02; 378/240.03
See application file for complete search history.

(56) References Cited

U.S. PATENT DOCUMENTS

| | | | |
|---|---|---|---|
| 4,167,028 A | 9/1979 | Tobey | |
| 4,775,900 A | 10/1988 | Blessinger | |
| 5,018,027 A | 5/1991 | Roggendorf | |
| 5,381,275 A | 1/1995 | Nitta et al. | |
| 5,696,558 A * | 12/1997 | Tsukamoto | 375/240.03 |
| 5,950,164 A | 9/1999 | Takahashi | |
| 6,389,223 B1 | 5/2002 | Aotake | |
| 6,459,850 B1 | 10/2002 | Bruls | |
| 6,654,417 B1 * | 11/2003 | Hui | 375/240.03 |
| 6,678,322 B1 * | 1/2004 | Mihara | 375/240.02 |
| 6,697,567 B1 * | 2/2004 | Suzuki | 386/111 |

FOREIGN PATENT DOCUMENTS

| | | |
|---|---|---|
| JP | 6-141298 | 5/1994 |
| JP | 9-23423 | 1/1997 |

* cited by examiner

*Primary Examiner*—Vincent F. Boccio
(74) *Attorney, Agent, or Firm*—Connolly Bove Lodge & Hutz LLP (57) ABSTRACT

In a video signal encoding and recording apparatus, a video signal is quantized into a quantization-resultant signal in response to a variable quantization scale. The quantization-resultant signal is recorded on a recording medium. The quantization scale is controlled in response to an encoding rate. The quantization scale is limited to within a range determined by a limit quantization scale. A remaining record capacity of the recording medium is measured. A remaining record time is measured. The encoding rate and the limit quantization scale are updated in response to the measured remaining record capacity and the measured remaining record time.

2 Claims, 10 Drawing Sheets

VIDEO SIGNAL ENCODING AND RECORDING APPARATUS WITH VARIABLE TRANSMISSION RATE

This application is a continuation of application Ser. No. 09/325,551, filed Jun. 4, 1999 now abandoned.

BACKGROUND OF THE INVENTION

1. Field of the Invention

This invention relates to a video signal encoding and recording apparatus with a variable transmission rate. Also, this invention relates to a method of encoding and recording a video signal at a variable transmission rate.

2. Description of the Related Art

It is known to use an MPEG2 (Moving Picture Experts Group phase 2) encoding apparatus in processing and compressing a video signal to be recorded on a recording medium.

Japanese published unexamined patent application 6-141298 discloses a variable-transmission-rate encoding apparatus for a moving picture signal. In the apparatus of Japanese application 6-141298, a picture-information transmission rate is controlled for every unit time during the encoding of the moving picture signal. The transmission rate control is designed so that the total code amount (the total number of bits) of the encoding-resultant signal will be equal to a prescribed value.

In the apparatus of Japanese application 6-141298, the encoding of the moving picture signal is implemented twice. The first encoding is preliminary encoding to calculate and determine a target transmission rate for every unit time. In the second encoding which follows the first encoding, the moving picture signal is processed in response to the target transmission rate for every unit time. A picture signal which results from the second encoding is used as a final encoding-resultant signal recorded on a recording medium or transmitted to an external apparatus.

In the apparatus of Japanese application 6-141298, during the preliminary encoding, a tentative code amount counter responsive to the output signal of a variable length coder detects the code amount of an encoding-resultant signal for every unit time. The tentative code amount counter determines a tentative transmission rate in accordance with the detected code amount for every unit time. An information piece of the tentative transmission rate for every unit time is stored in a memory. After the preliminary encoding has been completed, information pieces of tentative transmission rates for all the unit times are in the memory. Target transmission rates for respective unit times are calculated and determined in response to the tentative transmission rates. During the second encoding, the output signal of the variable length coder is written into a buffer. For every unit time, the signal is read out from the buffer in response to the target transmission rate. The signal which has been read out from the buffer is a final encoding-resultant signal.

Japanese published unexamined patent application 9-23423 discloses a variable-rate encoding apparatus for a moving picture signal. The apparatus of Japanese application 9-23423 implements the encoding of a video signal at an optimum encoding rate on an almost real-time basis. The optimum encoding rate is determined on the basis of the complexity of every picture represented by the video signal.

The apparatus of Japanese application 9-23423 includes a picture analysis circuit which calculates a mean value (L) and a variance (V) of a luminance signal in the video signal for every prescribed time. Also, the picture analysis circuit calculates mean values (R) of chrominance signals in the video signal for every prescribed time. Furthermore, the picture analysis circuit calculates a mean value (M) of motion vectors represented by the video signal for every prescribed time. In the apparatus of Japanese application 9-23423, an encoding control circuit determines a desired encoding bit rate on the basis of parameters including the mean luminance value (L), the luminance variance (V), the mean chrominance values (R), and the mean motion-vector value (M) which are calculated by the picture analysis circuit. For every prescribed time, the video signal is encoded at the desired encoding bit rate.

SUMMARY OF THE INVENTION

In the following description including a summary of this invention, a brief description of drawings, a description of embodiments of this invention, and claims of this invention, "record capacity" and "record time" are used instead of "recording capacity" and "recording time" respectively for simplicity.

It is a first object of this invention to provide an improved video signal encoding and recording apparatus with a variable transmission rate.

It is a second object of this invention to provide an improved method of encoding and recording a video signal at a variable transmission rate.

A first aspect of this invention provides a video signal encoding and recording apparatus comprising first means for quantizing a video signal into a quantization-resultant signal in response to a variable quantization scale; second means for recording the quantization-resultant signal generated by the first means on a recording medium; third means for controlling the quantization scale used by the first means in response to an encoding rate; fourth means for limiting the quantization scale used by the first means to within a range determined by a limit quantization scale; fifth means for measuring a remaining record capacity of the recording medium; sixth means for measuring a remaining record time; and seventh means for updating the encoding rate used by the third means and the limit quantization scale used by the fourth means in response to the remaining record capacity measured by the fifth means and the remaining record time measured by the sixth means.

A second aspect of this invention is based on the first aspect thereof, and provides a video signal encoding and recording apparatus wherein the limit quantization scale depends on an encoding type of a picture represented by the video signal.

A third aspect of this invention is based on the first aspect thereof, and provides a video signal encoding and recording apparatus wherein the sixth means comprises a counter for counting a number of frames represented by the quantization-resultant signal which has been recorded, and means for detecting the remaining record time in response to a scheduled total record time and a result of the counting by the counter.

A fourth aspect of this invention is based on the third aspect thereof, and provides a video signal encoding and recording apparatus further comprising means for changing the scheduled total record time.

A fifth aspect of this invention is based on the first aspect thereof, and provides a video signal encoding and recording apparatus wherein the fifth means comprises means for integrating a number of bits of the quantization-result signal recorded on the recording medium, means for detecting a type of the recording medium, means for detecting a total record capacity of the recording medium in response to the detected type thereof, and means for detecting the remaining record capacity in response to a result of the integrating and the detected total record capacity.

A sixth aspect of this invention is based on the first aspect thereof, and provides a video signal encoding and recording apparatus wherein the fifth means comprises means for detecting a currently-accessed position on the recording medium, and means for detecting the remaining record capacity in response to the detected currently-accessed position.

A seventh aspect of this invention is based on the first aspect thereof, and provides a video signal encoding and recording apparatus further comprising means for displaying a picture represented by the video signal, and means for superimposing a visualized information of the remaining record capacity and the remaining record time on the displayed picture.

An eighth aspect of this invention provides a video signal encoding and recording apparatus comprising first means for quantizing a video signal into a quantization-resultant signal in response to a variable quantization step; second means for recording the quantization-resultant signal generated by the first means on a recording medium; third means for calculating a remaining record capacity of the recording medium; fourth means for determining a capacity of a virtual buffer in response to the remaining record capacity calculated by the third means; fifth means for calculating a degree of occupancy of the virtual buffer having the capacity determined by the fourth means; and sixth means for controlling the quantization step used by the first means in response to the virtual-buffer occupancy degree calculated by the fifth means.

A ninth aspect of this invention is based on the eighth aspect thereof, and provides a video signal encoding and recording apparatus wherein the fifth means comprises means for determining a target mean transmission rate in response to the remaining record capacity calculated by the third means, means for detecting a transmission rate of the quantization-resultant signal, and means for calculating the virtual-buffer occupancy degree in response to the target mean transmission rate, the detected transmission rate, and the virtual-buffer capacity determined by the fourth means.

A tenth aspect of this invention provides a method of encoding and recording a video signal which comprising the steps of quantizing a video signal into a quantization-resultant signal in response to a variable quantization step; recording the quantization-resultant signal on a recording medium; calculating a remaining record capacity of the recording medium; determining a capacity of a virtual buffer in response to the calculated remaining record capacity; calculating a degree of occupancy of the virtual buffer having the determined capacity; and controlling the quantization step in response to the calculated virtual-buffer occupancy degree.

An eleventh aspect of this invention is based on the tenth aspect thereof, and provides a method wherein the virtual-buffer occupancy degree calculating step comprises determining a target mean transmission rate in response to the calculated remaining record capacity, detecting a transmission rate of the quantization-resultant signal, and calculating the virtual-buffer occupancy degree in response to the target mean transmission rate, the detected transmission rate, and the determined virtual-buffer capacity.

A twelfth aspect of this invention is based on the third aspect thereof, and provides a video signal encoding and recording apparatus wherein the seventh means comprises means for updating the encoding rate, the limit quantization scale, and the scheduled total record time according to a function having parameters including at least one of a total record capacity of the recording medium, a total record time, the remaining record capacity, the remaining record time, the limit quantization scale, and the scheduled total record time.

A thirteenth aspect of this invention is based on the first aspect thereof, and provides a video signal encoding and recording apparatus wherein the seventh means comprises a register for storing a signal of a variation allowance code amount for covering a code amount variation, means for updating the signal of the variation allowance code amount in response to one of the remaining record capacity and the remaining record time, and means for updating the encoding rate according to a function having a parameter being the variation allowance code amount represented by the signal in the register.

A fourteenth aspect of this invention provides a method comprising the steps of 1) quantizing a video signal into a quantization-resultant signal in response to a variable quantization scale; 2) recording the quantization-resultant signal generated by the step 1) on a recording medium; 3) controlling the quantization scale used by the step 1) in response to an encoding rate; 4) limiting the quantization scale used by the step 1) to within a range determined by a limit quantization scale; 5) measuring a remaining record capacity of the recording medium; 6) measuring a remaining record time; and 7) updating the encoding rate used by the step 3) and the limit quantization scale used by the step 4) in response to the remaining record capacity measured by the step 5) and the remaining record time measured by the step 6).

DESCRIPTION OF THE PREFERRED EMBODIMENTS

In the following description including a description of embodiments of this invention, and claims of this invention, "record capacity" and "record time" are used instead of "recording capacity" and "recording time" respectively for simplicity.

First Embodiment

Figure 1:
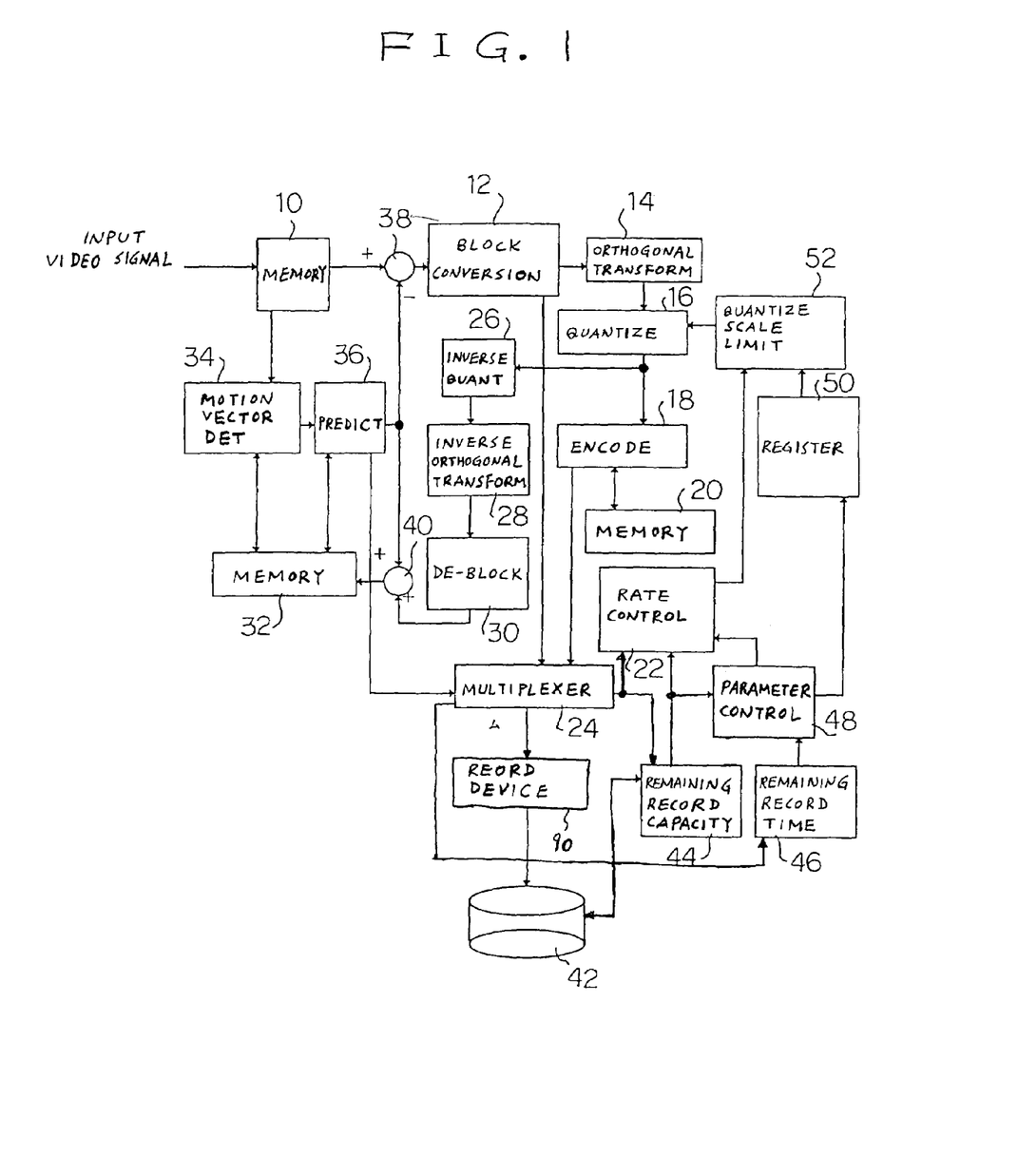
FIG. 1 is a block diagram of an encoding and recording apparatus according to a first embodiment of this invention.

FIG. 1 shows an encoding and recording apparatus according to a first embodiment of this invention. The encoding and recording apparatus of FIG. 1 includes a memory 10 followed by a motion-vector detection circuit 34 and a subtracter 38. The subtractor 38 is connected to a two-dimensional block conversion circuit 12. The two-dimensional block conversion circuit 12 is successively followed by an orthogonal transform circuit 14 and a quantization circuit 16. The, two-dimensional block conversion circuit 12 is connected to a multiplexer 24. The quantization circuit 16 is connected to an encoding circuit 18 and an inverse quantization circuit 26. The encoding circuit 18 is followed by the multiplexer 24. The encoding circuit 18 is connected to a memory 20.

The inverse quantization circuit 26 is successively followed by an inverse orthogonal transform circuit 28 and a de-block circuit 30. The de-block circuit 30 is connected to an adder 40. The adder 40 is connected to a memory 32. The memory 32 is connected to the motion-vector detection circuit 34 and a motion-compensated prediction circuit 36. The motion-vector detection circuit 34 is connected to the motion-compensated prediction circuit 36. The motion-compensated prediction circuit 36 is connected to the multiplexer 24, the subtracter 38, and the adder 40.

The multiplexer 24 is followed by a recording device 90. The recording device 90 is connected to a recording medium 42. The multiplexer 24 is connected to a rate control circuit 22, a remaining record capacity measurement circuit (a remaining recording capacity measurement circuit) 44, and a remaining record time measurement circuit (a remaining recording time measurement circuit) 46. The rate control circuit 22 is connected to a quantization scale limiting circuit (a quantization step limiting circuit) 52. Here, "quantization scale" means "quantization step". The remaining record capacity measurement circuit 44 is connected to the rate control circuit 22, the recording medium 42, and a parameter control circuit 48. The remaining record time measurement circuit 46 is connected to the parameter control circuit 48. The parameter control circuit 48 is connected to the rate control circuit 22 and a register 50. The register 50 is connected to the quantization scale limiting circuit 52. The quantization scale limiting circuit 52 is connected to the quantization circuit 16.

In the encoding and recording apparatus of FIG. 1, an input digital video signal is written into the memory 10. The input digital video signal is generated by, for example, a video camera. The digital video signal is read out from the memory 10. Writing and reading the digital video signal into and from the memory 10 are designed to rearrange pictures, which are represented by the digital video signal, according to an encoding syntax. The digital video signal outputted from the memory 10 is applied to the motion-vector detection circuit 34 and the subtracter 38.

The subtracter 38 receives a motion-compensated predicted digital video signal (motion-compensated predicted picture data) from the motion-compensated prediction circuit 36. The subtracter 38 calculates a difference or an error between the digital video signal from the memory 10 and the motion-compensated predicted digital video signal, and generates difference picture data or error picture data representing the calculated difference or error. The subtracter 38 outputs the difference picture data (the error picture data) to the two-dimensional block conversion circuit 12.

The two-dimensional block conversion circuit 12 divides every 1-frame-corresponding time segment or every 1-field-corresponding time segment of the difference picture data into a given number of blocks each having N pixels in a vertical direction and M pixels in a horizontal direction. Here, M and N denote predetermined natural numbers equal to, for example, 8. For every frame or field, the two-dimensional-block conversion circuit 12 outputs the picture data blocks to the orthogonal transform circuit 14 in a predetermined scanning order. The two-dimensional block conversion circuit 12 outputs information of the predetermined scanning order to the multiplexer 24.

The orthogonal transform circuit 14 subjects every picture data block to discrete cosine transform (DCT), thereby generating DCT-resultant picture data representing DCT coefficients. The orthogonal transform circuit 14 outputs the DCT-coefficient picture data to the quantization circuit 16. The quantization circuit 16 quantizes the DCT-coefficient picture data in response to a quantization scale represented by an output signal of the quantization scale limiting circuit 52. Here, "quantization scale" means "quantization step". The quantization circuit 16 outputs quantization-resultant picture data to the encoding circuit 18 and the inverse quantization circuit 26.

The encoding circuit 18 converts the quantization-resultant picture data into a sequence of corresponding words of a variable length code or a fixed length code by referring to an encoding table stored in the memory 20. The encoding circuit 18 outputs encoding-resultant picture data, which represents a sequence of code words, to the multiplexer 24.

The inverse quantization circuit 26 subjects the quantization-resultant picture data to inverse quantization, thereby returning the quantization-resultant picture data to the DCT-coefficient data. The inverse quantization circuit 26 outputs the DCT-coefficient data to the inverse orthogonal transform circuit 28. The inverse orthogonal transform circuit 28 subjects the DCT-coefficient data to inverse DCT, thereby returning the DCT-coefficient data to the picture data blocks. The inverse orthogonal transform circuit 28 outputs the picture data blocks to the de-block circuit 30. The de-block circuit 30 combines the picture data blocks to the difference picture data (the error picture data). The de-block circuit 30 outputs the difference picture data to the adder 40. The adder 40 receives the motion-compensated predicted picture data from the motion-compensated prediction circuit 36. The adder 40 combines the difference picture data and the motion-compensated predicted picture data into data (reproduced picture data) representing a reference picture for motion-compensated prediction. The adder 40 stores the reference picture data (the reproduced picture data) into the memory 32.

The motion-vector detection circuit 34 reads out the reference picture data from the memory 32. The motion-vector detection circuit 34 detects motion vectors between a present picture represented by the video signal outputted from the memory 10 and the reference picture represented by the data read out from the memory 32. The detection of motion vectors is based on a block matching technique. The motion-vector detection circuit 34 informs the motion-compensated prediction circuit 36 of the detected motion vectors. The motion-compensated prediction circuit 36 reads out the reference picture data from the memory 32. The motion-compensated prediction circuit 36 selects one from among plural prediction modes. The motion-compensated prediction circuit 36 subjects the reference picture data to motion compensation of the selected mode in response to the motion vectors, thereby converting the reference picture data into the motion-compensated predicted picture data (the motion-compensated predicted digital video signal). The motion-compensated prediction circuit 36 outputs the motion-compensated predicted picture data to the subtracter 38 and the adder 40. The motion-compensated prediction circuit 36 outputs information of the motion vectors to the multiplexer 24. The motion-compensated prediction circuit 36 outputs information of the selected prediction mode to the multiplexer 24.

The output video signal from the memory 10 which represents an I picture (an intra coded picture) is passed through the subtracter 38 without being processed thereby. The output video signal from the memory 10 which represents a P picture (a predictive coded picture) or a B picture (a bidirectionally predictive coded picture) is processed by the subtracter 38 as previously explained.

Similarly, the output picture data from the de-block circuit 30 which represents an I picture is passed through the adder 40 without being processed thereby. On the other hand, the output picture data from the de-block circuit 30 which represents a P picture or a B picture is added to the motion-compensated predicted picture data by the adder 40 as previously explained.

The multiplexer 24 receives the encoding-resultant picture data from the encoding circuit 18. The multiplexer 24 receives the information of the scanning order from the two-dimensional block conversion circuit 12. The multiplexer 24 receives the information of the motion vectors and the information of the prediction mode from the motion-compensated prediction circuit 36. The multiplexer 24 combines or multiplexes the encoding-resultant picture data, the scanning order information, the motion-vector information, and the prediction-mode information into a steam of bits. The multiplexer 24 outputs the bit stream to the recording device 90. The recording device 90 subjects the bit stream to modulation and signal processing for record, thereby converting the bit stream into a processing-resultant signal. The recording device 90 outputs the processing-resultant signal to the recording medium 42. Specifically, the recording device 90 records the processing-resultant signal on the recording medium 42. Examples of the recording medium 42 are a DVD (digital versatile disc), a magneto-optical disc, a magnetic disc, a CD (compact disc), a magnetic tape, and an IC memory.

Regarding the output bit stream, the multiplexer 24 produces a generated code amount signal representing the number of bits generated in every unit time, that is, the code amount generated in every unit time. The generated code amount for every unit time means the transmission rate. The multiplexer 24 outputs the generated code amount signal to the remaining record capacity measurement circuit 44 and the rate control circuit 22.

Figure 2:
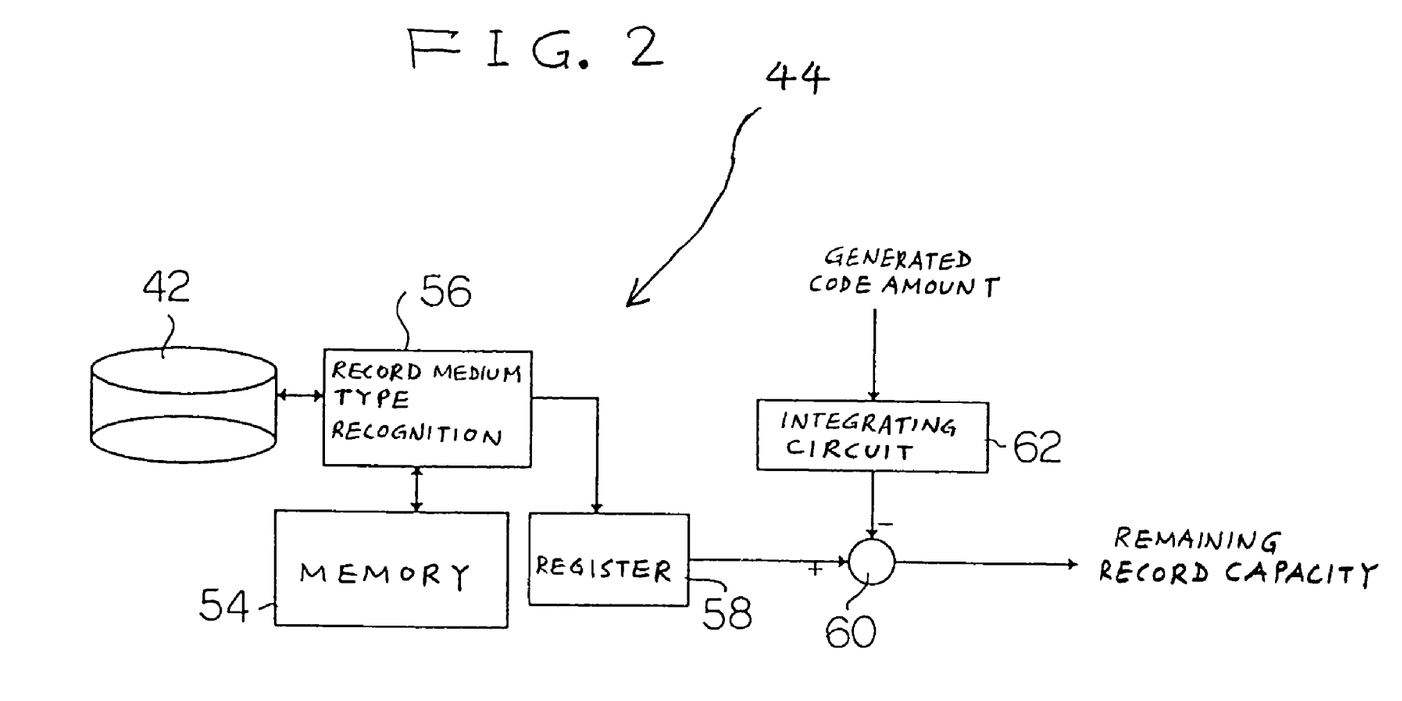
FIG. 2 is a block diagram of a remaining record capacity measurement circuit in FIG. 1.

As shown in FIG. 2, the remaining record capacity measurement circuit 44 includes a memory 54, a recording medium type recognition circuit 56, a register 58, a subtracter 60, and a code amount integrating circuit 62. The recording medium type recognition circuit 56 is connected to the recording medium 42, the memory 54, and the register 58. The register 58 is connected to the subtracter 60. The code amount integrating circuit 62 is connected to the subtracter 60. The subtracter 60 is connected to the rate control circuit 22 and the parameter control circuit 48 (see FIG. 1).

In the case where the recording medium 42 does not store information of a total record capacity thereof, the recording medium type recognition circuit 56 operates as follows. Before the recording device 90 starts to record the processing-resultant signal on the recording medium 42, the recording medium type recognition circuit 56 accesses the recording medium 42 to read out information of the type thereof. The memory 54 stores a preset table indicating the correspondence relation between recording medium types and total record capacities. The recording medium type recognition circuit 56 accesses the table in the memory 54, and detects or decides the total record capacity of the recording medium 42 in response to the type thereof by referring to the accessed table. The recording medium type recognition circuit 56 loads the register 58 with information of the detected total record capacity of the recording medium 42.

In the case where the recording medium 42 stores information of a total record capacity thereof, the recording medium type recognition circuit 56 operates as follows. Before the recording device 90 starts to record the processing-resultant signal on the recording medium 42, the recording medium type recognition circuit 56 accesses the recording medium 42 to read out information of the total record capacity thereof. The recording medium type recognition circuit 56 loads the register 58 with information of the readout total record capacity of the recording medium 42.

The information of the total record capacity of the recording medium 42 is outputted from the register 58 to the subtracter 60. During the recording of the output signal of the recording device 90 on the recording medium 42, the code amount integrating circuit 62 receives the generated code amount signal from the multiplexer 24. The code amount integrating circuit 62 integrates the generated code amount represented by the generated code amount signal to calculate the integrated code amount (the number of bits) which has been generated up to the present moment. The code amount integrating circuit 62 outputs a signal of the integrated code amount to the subtracter 60. The device 60 subtracts the integrated code amount from the total record capacity of the recording medium 42 to calculate the remaining record capacity of the recording medium 42. The subtracter 60 outputs a signal of the remaining record capacity to the rate control circuit 22 and the parameter control circuit 48.

Figure 3:
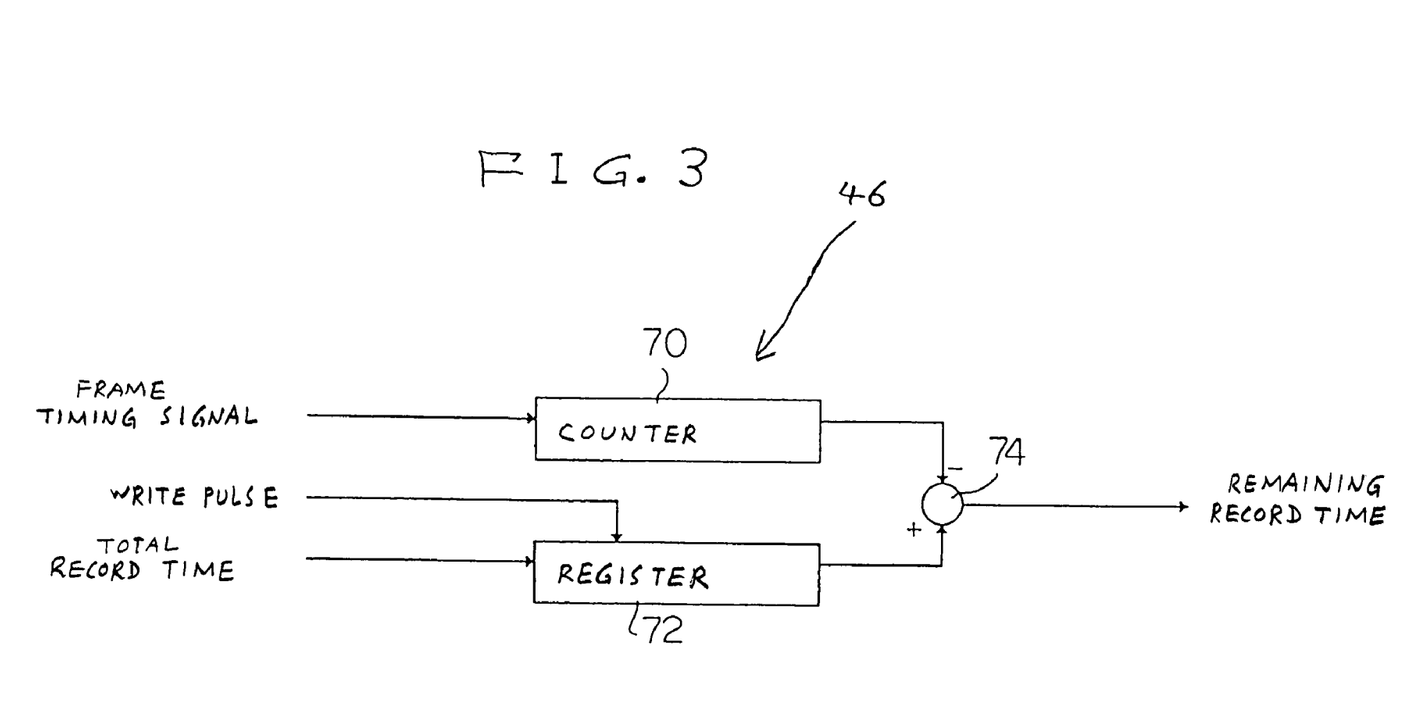
FIG. 3 is a block diagram of a remaining record time measurement circuit in FIG. 1.

As shown in FIG. 3, the remaining record time measurement circuit 46 includes a counter 70, a register 72, and a subtracter 74. The counter 70 is connected to the multiplexer 24 (see FIG. 1) and the subtracter 74. The register 72 is connected to an apparatus controller (not shown) and the subtracter 74. The subtracter 74 is connected to the parameter control circuit 48 (see FIG. 1).

Before the recording device 90 starts to record the processing-resultant signal on the recording medium 42, the apparatus controller (not shown) outputs a write pulse and data representative of a desired total record time (a scheduled total record time) to the register 72. The data of the desired total record time is stored into the register 72 in response to the write pulse. The desired total record time is expressed by a desired total frame number. The desired total record time is determined for the input digital video signal.

During the recording of the output signal of the recording device 90 on the recording medium 42, the multiplexer 24 outputs a frame timing signal to the counter 70. The device 70 counts pulses of the frame timing signal to calculate the number of frames which have been encoded up to the present moment. The counter 70 outputs information of the calculated number of encoded frames to the subtracter 74. The register 72 outputs information of the desired total frame number to the subtracter 74. The device 74 subtracts the encoded frame number from the desired total frame number to calculate the number of remaining frames which have not yet been encoded. The subtracter 74 informs the parameter control circuit 48 of the calculated number of remaining frames as the remaining record time for the input digital video signal.

For every prescribed time interval during the recording of the output signal of the recording device 90 on the recording medium 42, the parameter control circuit 48 updates a target encoding rate (a target transmission rate) and a limit quantization scale in response to the remaining record capacity of the recording medium 42 and the remaining record time for the input digital video signal. The parameter control circuit 48 loads the register 50 with information of the new (updating-resultant) limit quantization scale. The information of the new limit quantization scale is fed from the register 50 to the quantization scale limiting circuit 52. The parameter control circuit 48 informs the rate control circuit 22 of the new (updating-resultant) target encoding rate.

As previously indicated, the rate control circuit 22 is informed of the remaining record capacity of the recording medium 42 by the remaining record capacity measurement circuit 44. In addition, the rate control circuit 22 is informed of the generated code amount by the multiplexer 24. The rate control circuit 22 calculates a target code amount (a target number of bits) generated for a next frame from the generated code amount, the new target encoding rate, and the remaining record capacity. The rate control circuit 22 determines a first target quantization scale in response to the calculated target code amount for the next frame. The rate control circuit 22 outputs information of the first target quantization scale to the quantization scale limiting circuit 52.

The rate control circuit 22 simulates conditions of a stream buffer in a decoding apparatus. The first target quantization scale is chosen by the rate control circuit 22 to prevent code data from overflowing the stream buffer. The first target quantization scale is determined regardless of whether or not code data underflows with respect to the stream buffer.

The quantization scale limiting circuit 52 compares the first target quantization scale with the limit quantization scale. When the first target quantization scale is equal to or smaller than the limit quantization scale, the quantization scale limiting circuit 52 sets a second target quantization scale to the limit quantization scale. When the first target quantization scale is greater than the limit quantization scale, the quantization scale limiting circuit 52 sets the second target quantization scale to the first target quantization scale. Accordingly, the second target quantization scale is limited to within a range equal to or above the limit quantization scale.

The quantization scale limiting circuit 52 informs the quantization circuit 16 of the second target quantization scale. The quantization circuit 16 sets an actual quantization scale to the second target quantization scale. The quantization circuit 16 quantizes the DCT-coefficient picture data in response to the actual quantization scale. As understood from the previous explanation, the actual quantization scale used in the quantization circuit 16 is limited to within a range equal to or above the limit quantization scale given by the parameter control circuit 48.

In general, the degree of human-eye-sensed deterioration in pictures represented by quantization-resultant data drops as a quantization scale actually used in quantization decreases. Preferably, the limit quantization scale given by the parameter control circuit 48 is equal to the maximum limit of a quantization scale range where the degree of human-eye-sensed deterioration in pictures represented by the quantization-resultant data is negligibly small. In addition, an initial value of the limit quantization scale is set to a level at which the degree of human-eye-sensed deterioration in pictures represented by the quantization-resultant data is negligibly small.

As previously indicated, the actual quantization scale is limited to within the range equal to or above the limit quantization scale.

This limitation of the actual quantization scale provides the following process. For picture data representing a picture corresponding to a low degree of difficulty in encoding, an output bit stream has an encoding rate (a transmission rate) equal to or less than a setting rate.

In the case where the generated code amount corresponds to less than the target encoding rate, an unused code amount remains. The parameter control circuit 48 detects such an unused code amount. The parameter control circuit 48 implements assignment of the unused code amount so that the unused code amount can be absorbed or used by signal processing in a later stage (signal processing in the remaining record time). The parameter control circuit 48 sets the new target encoding rate, that is, the new target transmission rate, in response to the unused code amount. Specifically, the new target encoding rate rises as the unused code amount increases.

Preferably, the limit quantization scale given by the parameter control circuit 48 depends on the type (the encoding type) of a picture represented by the picture data processed by the quantization circuit 16. Specifically, the limit quantization scale for an I picture is smaller than that for a P picture. The limit quantization scale for a P picture is smaller than that for a B picture.

Operation of the encoding and recording apparatus of FIG. 1 will be further explained. Preferably, the assignment of the unused code amount and the updating of the target encoding rate are implemented for every specified time interval corresponding to a GOP (group of pictures), a plurality of GOP's, or a frame.

The parameter control circuit 48 calculates a first new target encoding rate CR according to the following equation.

$$CR=(RB-MB)*FR/RF \qquad (1)$$

where RB denotes the remaining record capacity; MB denotes a variation allowance code amount for covering a code amount variation; FR denotes a frame rate (frames/second) of the input digital video signal; RF denotes the remaining record time; and "*" denotes an operator of production (multiplication). Specifically, the variation allowance code amount MB is designed to absorb a code amount variation in a virtual buffer of the encoding rate control. As the encoding progresses, the target encoding rate is controlled in the direction of increasing a margin of the code amount. Accordingly, it is preferable that the variation allowance code amount MB is initialized to a negative value at the start of the recording of the output signal of the recording device 90 on the recording medium 42, and is increased as the encoding progresses. In this case, the encoding can be suitably executed even at a start of the encoding for which data to be processed represents a picture corresponding to a high degree of difficulty in encoding. The parameter control circuit 48 compares the first new target encoding rate CR with a given maximum transmission rate MR related to signal transmission to the recording medium 42. When the first new target encoding rate CR is equal to or greater than the given maximum transmission rate MR, the parameter control circuit 48 sets a second new target encoding rate to the given maximum transmission rate MR. When the first new target encoding rate CR is smaller than the given maximum transmission rate MR, the parameter control circuit 48 sets the second new target encoding rate to the first new target encoding rate CR. Accordingly, the second new target encoding rate is limited to within a range equal to or below the given maximum transmission rate MR. The parameter control circuit 48 informs the rate control circuit 22 of the second new target encoding rate as a final new target encoding rate.

Preferably, the parameter control circuit 48 decreases the limit quantization scale below its initial value to increase the generated code amount in the case where the first new target encoding rate CR exceeds the given maximum transmission rate MR. The decrease in the limit quantization scale enables the total record capacity of the recording medium 42 to be used by the recorded information at a higher percentage when the recording of the output signal of the recording device 90 on the recording medium 42 ends.

The limit quantization scale given by the parameter control circuit 48 is referred to as the minimum quantization scale. According to an example, the parameter control circuit 48 calculates the minimum quantization scale (the updating-resultant minimum quantization scale) Min_Qscale according to the following equations.

$$\text{Min\_Qscale}=\text{Maximum}(A, B) \quad (2)$$

$$A=\text{Algo\_Min\_Qscale} \quad (3)$$

$$B=\text{Org\_Min\_Qscale}-\alpha*(\text{Coding\_Rate}/\text{Org\_Coding\_Rate}-1) \quad (4)$$

where Maximum(A, B) means selection of a greater of "A" and "B"; Algo_Min_Qscale denotes a theoretical minimum quantization scale determined by the present encoding algorithm; Org_Min_Qscale denotes the initial value of the minimum quantization scale; Coding_Rate denotes the updating-resultant target encoding rate; Org_Coding_Rate denotes an initial value of the target encoding rate; and "α" denotes a predetermined integer.

Figure 4:
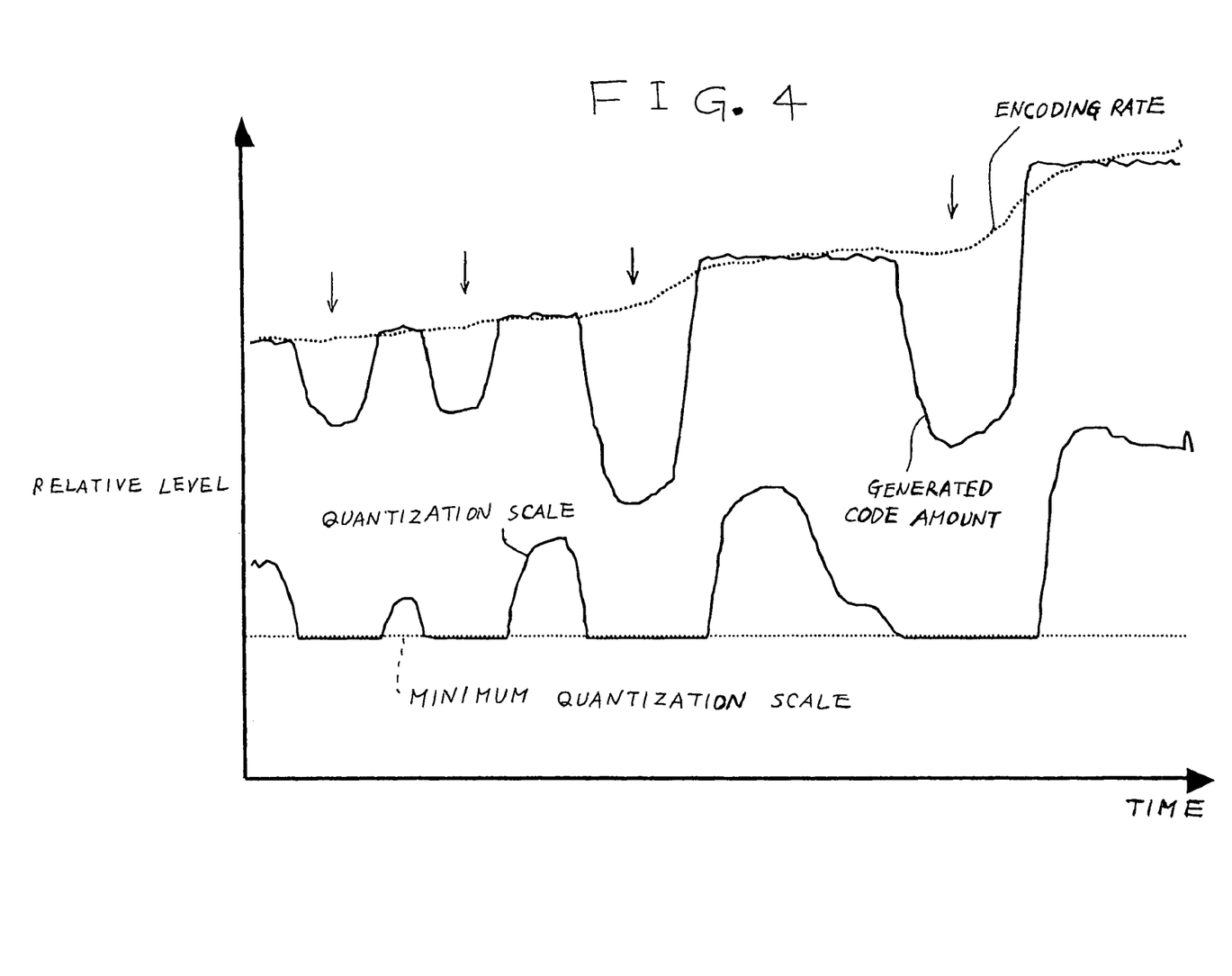
FIG. 4 is a time-domain diagram of a target encoding rate, a generated code amount, and an actual quantization scale in the apparatus of FIG. 1.

FIG. 4 shows an example of time-domain variations in the target encoding rate given by the parameter control circuit 48, the generated code amount represented by the output signal of the multiplexer 24, and the actual quantization scale used in the quantization circuit 16.

In the encoding and recording apparatus of FIG. 1, a mean encoding rate is derived from the total record capacity of the recording medium 42 and the desired total record time for the input digital video signal. The mean encoding rate is used as a basic target encoding rate. A final target encoding rate is determined in response to the basic target encoding rate and other parameters. The minimum quantization scale (the limit quantization scale) is equal to the maximum limit of a quantization scale range where human-eye-sensed deterioration in pictures represented by the quantization-resultant data is negligible. The code amount generated in every unit time or the transmission rate is feedback-controlled so that the generated code amount will not exceed a level corresponding to the target encoding rate as shown in FIG. 4.

In the case where the input digital video signal represents a picture to which the minimum quantization scale is applied, the generated code amount is smaller than a level corresponding to the target encoding rate as denoted by the arrows in FIG. 4. The smaller generated code amount causes a margin of the code amount which is assigned to later signal processing. This process enables the input digital video signal representative of complicated pictures to be more surely recorded on the recording medium 42 in the desired total record time.

As previously mentioned, in the case where the input digital video signal corresponds to a first new target encoding rate CR greater than the given maximum transmission rate MR, the given maximum transmission rate MR is used as a final target encoding rate (a second new encoding rate). In this case, the desired total record time may be increased. Specifically, the data of the original desired total record time in the register 72 is replaced by data of the increased desired total record time, and the increased desired total record time is used by later signal processing.

Second Embodiment

Figure 5:
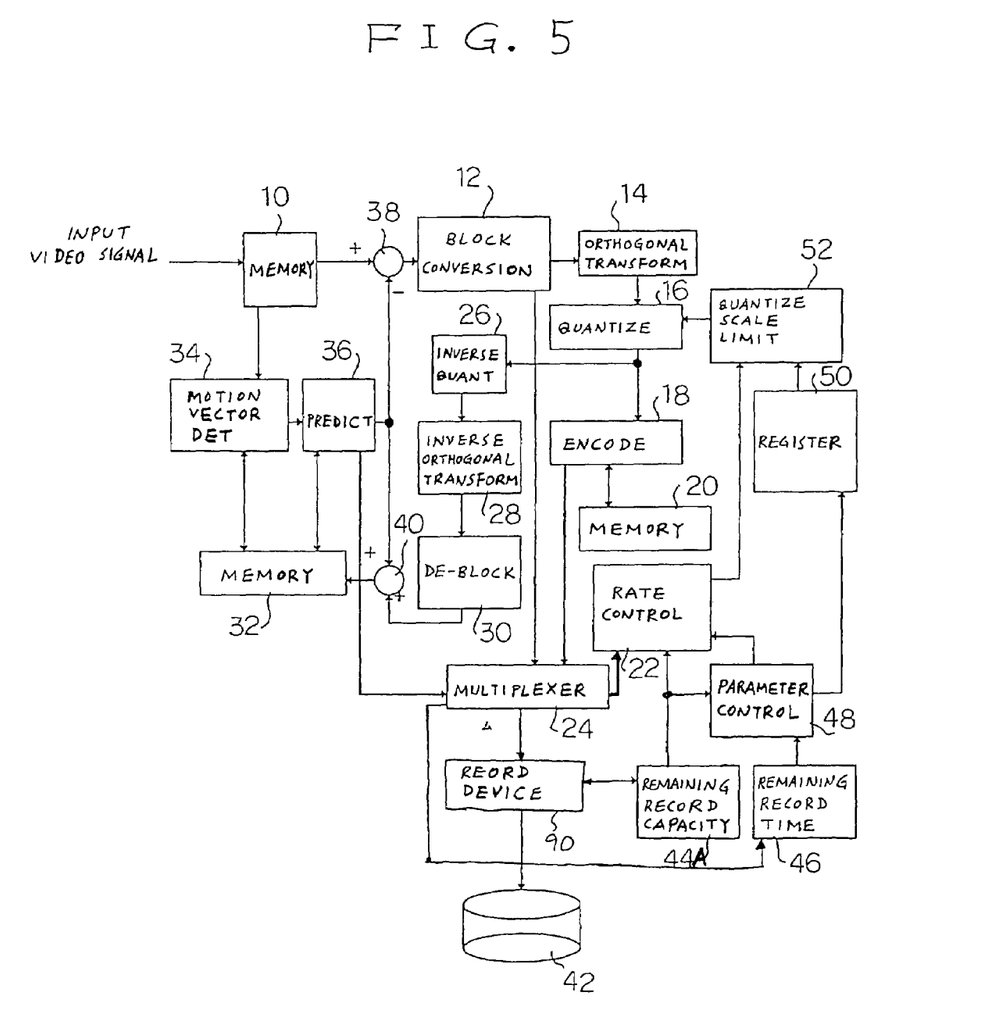
FIG. 5 is a block diagram of an encoding and recording apparatus according to a second embodiment of this invention.

FIG. 5 shows an encoding and recording apparatus according to a second embodiment of this invention. The encoding and recording apparatus of FIG. 5 is similar to the encoding and recording apparatus of FIG. 1 except for design changes indicated hereinafter.

The encoding and recording apparatus of FIG. 5 includes a remaining record capacity measurement circuit 44A which replaces the remaining record capacity measurement circuit 44 in FIG. 1. The remaining record capacity measurement circuit 44A is disconnected from a multiplexer 24 and a recording medium 42. The remaining recording capacity measurement circuit 44A is connected to a recording device 90.

Figure 6:
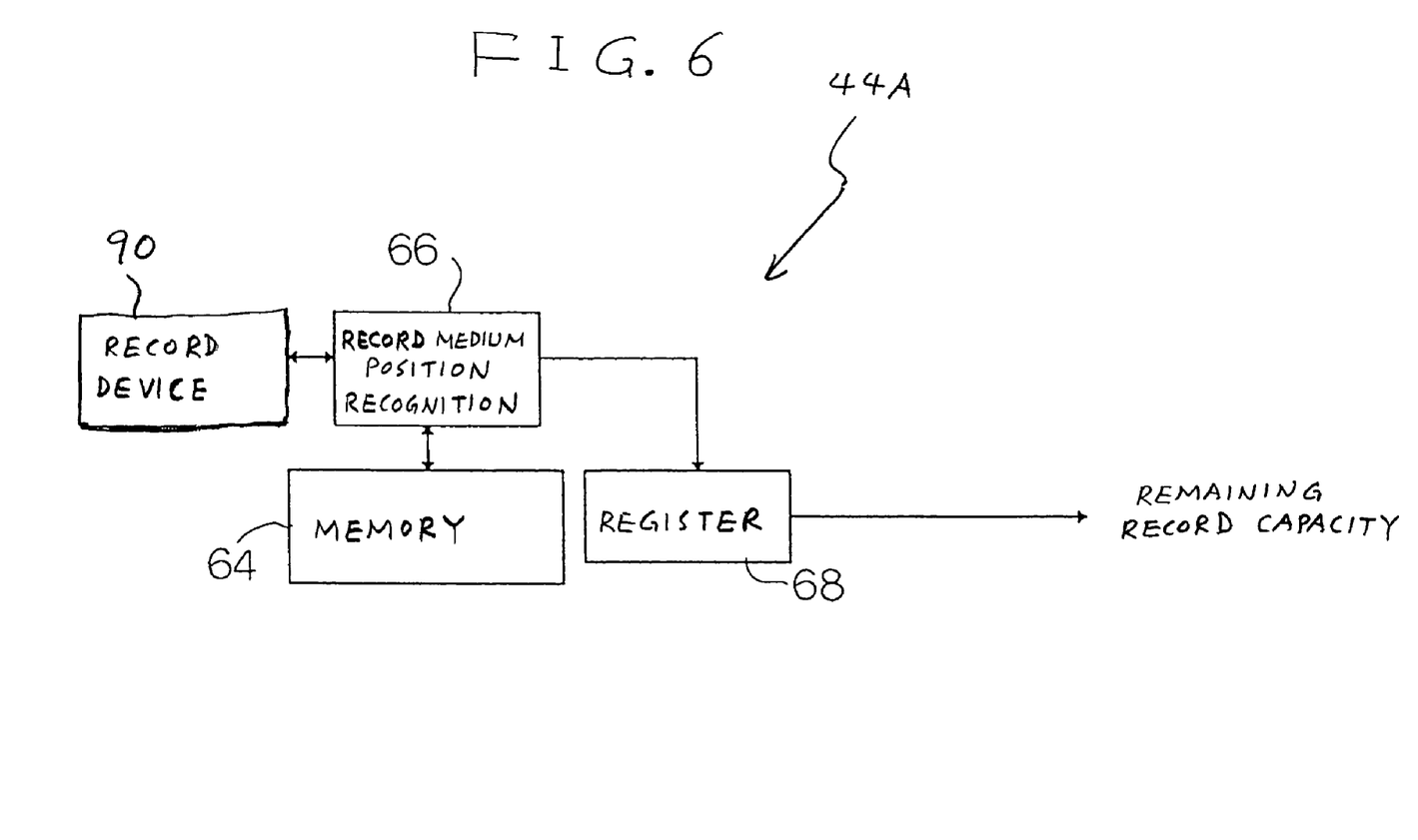
FIG. 6 is a block diagram of a remaining record capacity measurement circuit in FIG. 5.

As shown in FIG. 6, the remaining record capacity measurement circuit 44A includes a memory 64, a recording medium accessed-position recognition circuit 66, and a register 68. The recording medium accessed-position recognition circuit 66 is connected to the recording device 90, the memory 64, and the register 68. The register 68 is connected to a rate control circuit 22 and a parameter control circuit 48 (see FIG. 5).

The memory 64 stores a preset table indicating the correspondence relation between a currently-accessed point in the recording medium 42 and a remaining record capacity of the recording medium 42. The currently-accessed point means a position in the recording medium 42 which is currently accessed by the recording device 90.

During the recording of an output signal of the recording device 90 on the recording medium 42, the recording medium accessed-position recognition circuit 66 receives a signal from the recording device 90 which represents the currently-accessed position in the recording medium 42. The recording medium accessed-position recognition circuit 66 determines or detects the remaining record capacity of the recording medium 42 in response to the currently-accessed position by referring to the table in the memory 64. The recording medium accessed-position recognition circuit 66 loads the register 68 with information of the detected remaining record capacity of the recording medium 42. The information of the remaining record capacity is transmitted from the register 68 to the rate control circuit 22 and the parameter control circuit 48.

Third Embodiment

Figure 7:
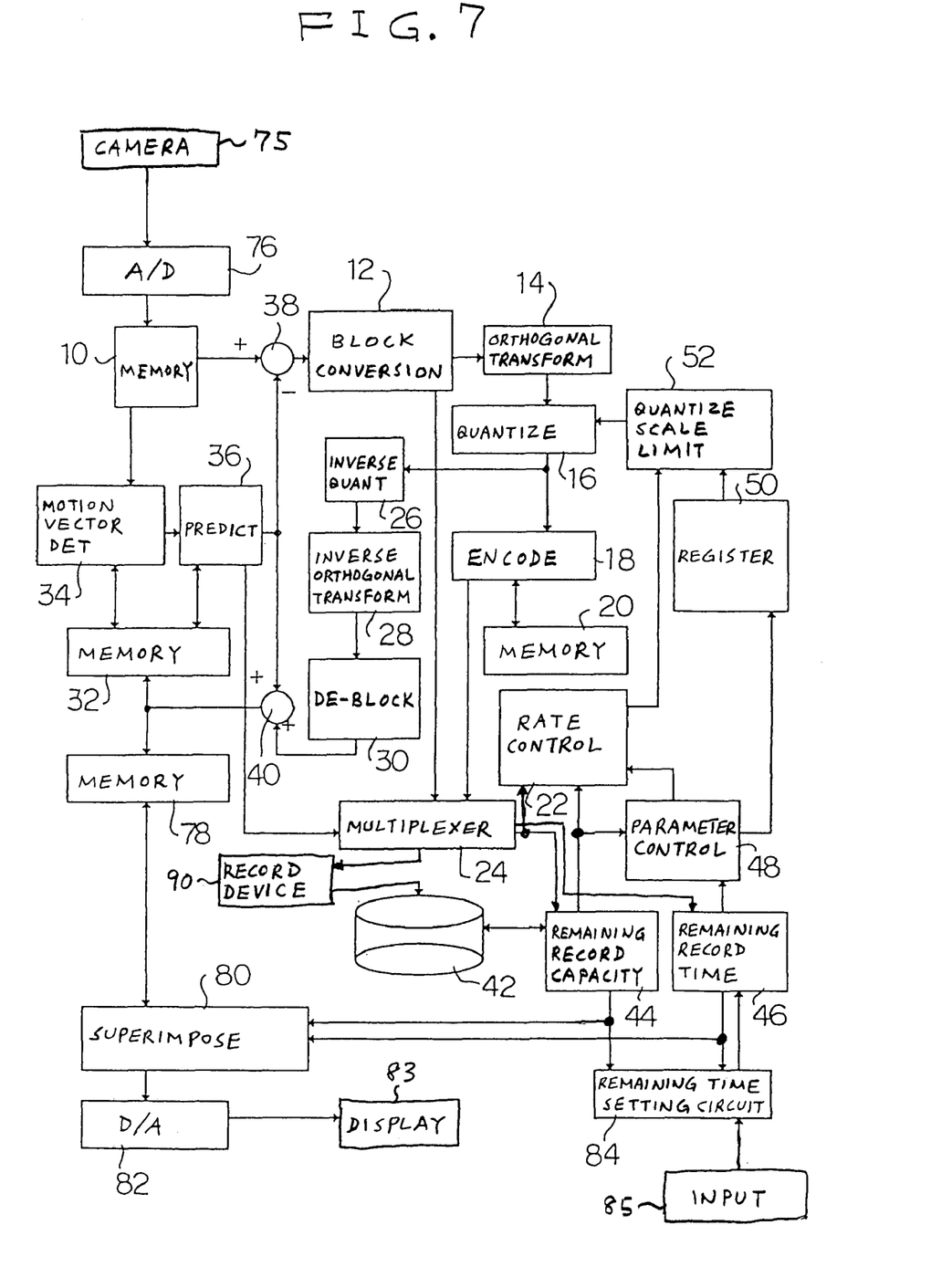
FIG. 7 is a block diagram of an encoding and recording apparatus according to a third embodiment of this invention.

FIG. 7 shows an encoding and recording apparatus according to a third embodiment of this invention. The encoding and recording apparatus of FIG. 7 is similar to the encoding and recording apparatus of FIG. 1 except for design changes indicated hereinafter.

With reference to FIG. 7, a video camera 75 outputs an analog video signal to an A/D (analog-to-digital) conversion circuit 76. The A/D conversion circuit 76 changes the analog video signal into a corresponding digital video signal. The A/D conversion circuit 76 outputs the digital video signal which is written into a memory 10.

The output side of an adder 40 is connected to a memory 78. The memory 78 is connected to a superimposing circuit 80. The superimposing circuit 80 is successively followed by a D/A (digital-to-analog) conversion circuit 82 and a monitor display 83. A remaining record capacity measurement circuit 44 and a remaining record time measurement circuit 46 are connected to the superimposing circuit 80 and a remaining time setting circuit 84. The remaining time setting circuit 84 is connected to an input device 85 which can be operated by a user.

Reproduced picture data outputted from the adder 40 is stored into the memory 78. The superimposing circuit 80 reads out the reproduced picture data from the memory 78. The superimposing circuit 80 receives a signal from the remaining record capacity measurement circuit 44 which represents a remaining record capacity of a recording medium 42. The superimposing circuit 80 receives a signal from the remaining record time measurement circuit 46 which represents a remaining record time. The superimposing circuit 80 converts the signals of the remaining record capacity and the remaining record time into corresponding character data or corresponding graphics data. The superimposing circuit 80 superimposes the character data or the graphics data on the reproduced picture data. The superimposing circuit 80 outputs superimposition-resultant picture data to the D/A conversion circuit 82. The D/A conversion circuit 82 changes the superimposition-resultant picture data into a corresponding analog video signal. The D/A conversion circuit 82 outputs the analog video signal to the monitor display 83. The monitor display 83 indicates every picture represented by the analog video signal. The picture indicated on the monitor display 83 includes a reproduced picture and characters or graphics of the remaining record capacity and the remaining record time.

The input device 85 can be operated by the user to provide record time change information to the remaining time setting circuit 84. The remaining time setting circuit 84 receives the signal from the remaining record capacity measurement circuit 44 which represents the remaining record capacity of the recording medium 42. The remaining time setting circuit 84 receives the signal from the remaining record time measurement circuit 46 which represents the remaining record time. The remaining time setting circuit 84 calculates an allowable change quantity from the record time change information, the remaining record capacity, and the remaining record time. The allowable change quantity corresponds to conditions where the encoding can be prevented from failing. The remaining time setting circuit 84 increases or decreases a desired total record time in response to the record time change information by a value within the allowable change quantity. Thus, the remaining time setting circuit 84 updates the desired total record time into a new total record time (an updating-resultant total record time). The remaining time setting circuit 84 replaces data of the desired total record time in a register 72 (see FIG. 3) of the remaining record time measurement circuit 46 by data of the new total record time (the updating-resultant total record time). The new total record time is used by later signal processing.

The user can confirm the remaining record capacity of the recording medium 42 and the remaining record time by watching pictures indicated on the monitor display 83. During the recording of an output signal of a recording device 90 on the recording medium 42, if the remaining record time is required to increase, the user operates the input device 85 to extend the desired total record time. The extension in the desired total record time causes an increase in the remaining record time. Accordingly, a trade-off between the quality of pictures represented by the recorded video signal and the remaining record time can be controlled by the user. When the user operates the input device 85 to shorten the desired total record time, a greater code amount can be assigned to a remaining portion of the encoding-resultant bit stream. In this case, the quality of pictures represented by the remaining portion of the encoding-resultant bit stream can be increased.

It should be noted that the remaining record capacity measurement circuit 44 may be replaced by the remaining record capacity measurement circuit 44A in FIGS. 5 and 6.

Fourth Embodiment

Figure 8:
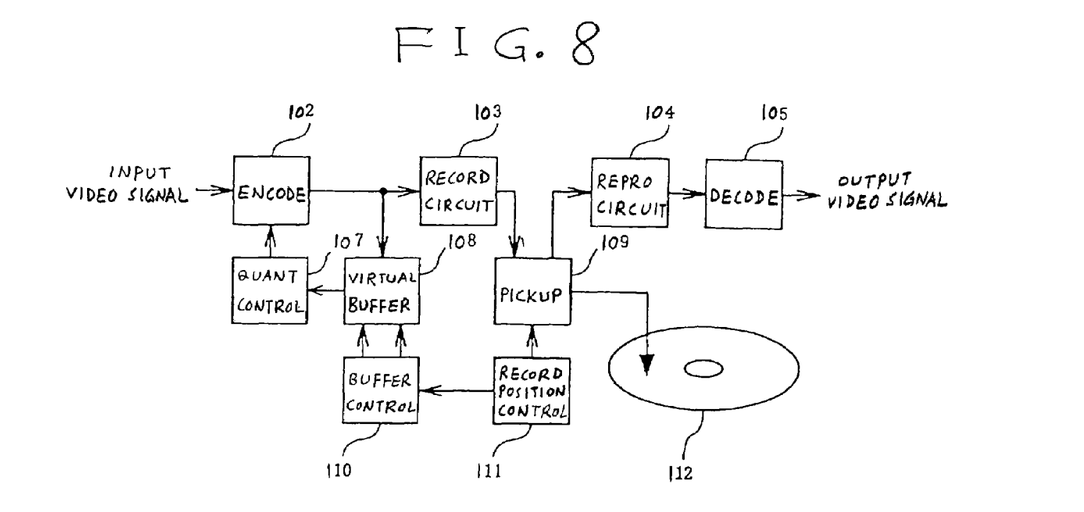
FIG. 8 is a block diagram of a recording and reproducing system according to a fourth embodiment of this invention.

FIG. 8 shows a recording and reproducing system including a video signal encoding and recording apparatus with a variable transmission rate according to a fourth embodiment of this invention.

The recording and reproducing system of FIG. 8 includes an encoder 102, a recording circuit 103, a reproducing circuit 104, a decoder 105, a quantization controller 107, a virtual buffer 108, a pickup head 109, a buffer controller 110, and a record position controller 111.

The encoder 102 is connected to the recording circuit 103 and the virtual buffer 108. The recording circuit 103 is connected to the pickup head 109. The pickup head 109 can access a recording medium 112. The record position controller 111 is connected to the pickup head 109 and the buffer controller 110. The buffer controller 110 is connected to the virtual buffer 108. The virtual buffer 108 is connected to the quantization controller 107. The quantization controller 107 is connected to the encoder 102. The pickup head 109 is connected to the reproducing circuit 104. The reproducing circuit 104 is connected to the decoder 105.

The system of FIG. 8 operates in either a recording mode or a reproducing mode. The recording mode of operation of the system of FIG. 8 will be explained below.

With reference to FIG. 8, the encoder 102 receives an input digital video signal representing a sequence of moving pictures. In the case where the encoder 102 handles an input analog video signal, a front end of the encoder 102 has an analog-to-digital converter which changes the input analog video signal into a corresponding digital video signal fed to a digital encoding stage. The encoder 102 subjects the input digital video signal to a highly efficient encoding process such as an MPEG2 encoding process, thereby converting the input digital video signal into a bit stream of a given code. In the encoding process by the encoder 102, a transmission rate is variable, and the encoding-resultant code amount for every unit time (that is, the number of bits generated by the encoding process for every unit time) varies according to conditions of pictures represented by the input digital video signal. The encoder 102 outputs the resultant bit stream to the recording circuit 103 and the virtual buffer 108.

The virtual buffer 108 calculates or derives a virtual-buffer occupancy degree (a ratio of an occupied area in a virtual buffer to the total area of the virtual buffer) from the bit stream, a target mean transmission rate, and a virtual-buffer capacity. The virtual buffer 108 informs the quantization controller 107 of the calculated virtual-buffer occupancy degree. The target mean transmission rate and the virtual-buffer capacity used in the virtual buffer 108 are set by control information fed from the buffer controller 110.

The buffer controller 110 receives information from the record position controller 111 which represents a remaining record capacity (a remaining recording capacity or an unused recording capacity) of the recording medium 112. The buffer controller 110 determines the target mean transmission rate and the virtual-buffer capacity on the basis of the remaining record capacity. The buffer controller 110 generates the control information which represents the determined target mean transmission rate and the determined virtual-buffer capacity. The buffer controller 110 outputs the control information to the virtual buffer 108.

The record position controller 111 detects or estimates an unrecorded area or a recordable area in the recording medium 112 in response to the total record capacity of the recording medium 112, historical conditions of a recording process which has been implemented up to the present moment, and TOC (table of contents) information on the recording medium 112. The record position controller 111 calculates the remaining record capacity (the unused record capacity) of the recording medium 112 from the unrecorded area in the recording medium 112. The record position controller 111 informs the buffer controller 110 of the calculated remaining record capacity.

The quantization controller 107 determines a target quantization step in response to the virtual-buffer occupancy degree. The quantization controller 107 informs the encoder 102 of the determined target quantization step.

Figure 9:
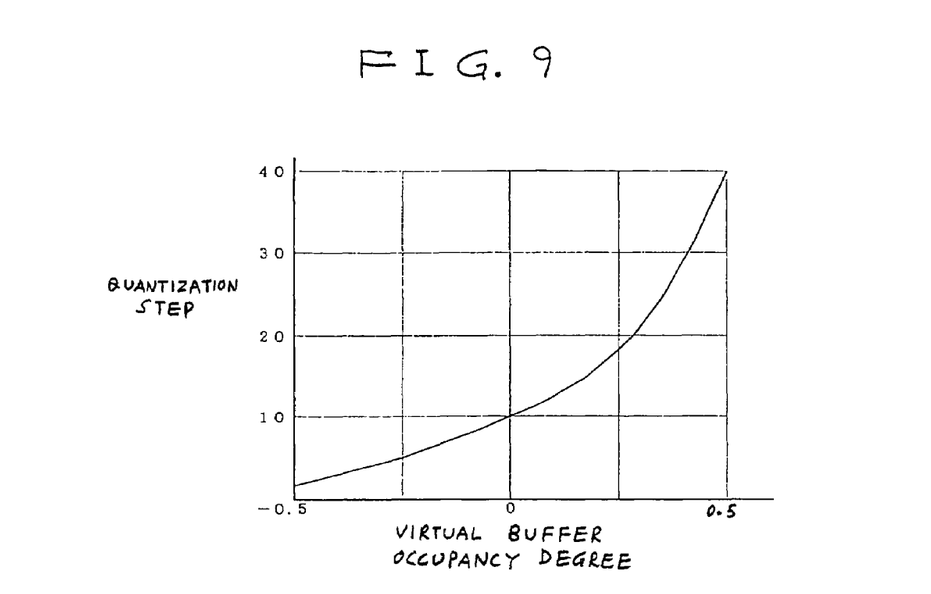
FIG. 9 is a diagram of the relation between a target quantization step and a virtual-buffer occupancy degree in the system of FIG. 8.

With reference to FIG. 9, the target quantization step determined by the quantization controller 107 increases as the virtual-buffer occupancy degree rises. The quantization controller 107 includes a memory storing a preset table which represents the relation between the target quantization step and the virtual-buffer 15 occupancy degree. The determination of the target quantization step in response to the virtual-buffer occupancy degree isimplemented by referring to the table.

The encoding process by the encoder 102 includes a sub process of quantizing video data (picture data), which is derived from the input digital video signal, in response to a quantization step equal to the target quantization step. In general, as the quantization step used by the encoder 102 increases, the encoding resultant code amount for every unit time (that is, the number of bits generated by the encoding process for every unit time, or the encoding-resultant transmission rate) decreases.

The recording circuit 103 subjects the bit stream to signal processes for digital recording, such as error-correction code word addition and EFM modulation. Accordingly, the recording circuit 103 converts the bit stream into a recordable signal (a processing resultant signal). The recording circuit 103 outputs the recordable signal to a pickup head 109.

The pickup head 109 records the output signal of the recording circuit 103 on the recording medium 112. The record position controller 111 determines an updatable desired track position on the recording medium 112. The record position controller 111 informs the pickup head 109 of the desired track position. The pickup head 109 accesses a track position on the recording medium 112 which is equal to the desired track position. and records the output signal of the recording circuit 103 on the accessed track position. In general, the rate of recording the output signal of the recording circuit 103 on the recording medium 112 by the pickup head 109 is equal to a given fixed value. On the other hand, the transmission rate related to the output signal of the recording circuit 103 is variable. Therefore, the output signal of the recording circuit 103 is intermittently recorded on the recording medium 112 in the case where the transmission rate related to the output signal of the recording circuit 103 is relatively low. The output signal of the recording circuit 103 is continuously recorded on the recording medium 112 in the case where the transmission rate related to the output signal of the recording circuit 103 is high.

The position on the recording medium 112 which is currently accessed by the pickup head 109 is controlled by the record position controller 111. The record position control by the record position controller 111 is designed so that the output signal of the recording circuit 103 will be sequentially recorded on an unrecorded area (a recordable area) in the recording medium 112. Preferably, the recording medium 112 is an optical disc having a record capacity of about 10 gigabytes. In this case, the recording of video information for 5 hours can be implemented whein a mean transmission rate is equal to 4 Mbps.

During the reproducing mode, the system of FIG. 8 operates as follows. The pickup head 109 reads out a recorded signal from the recording medium 112. In general, the rate of reading out the recorded information from the recording medium 112 by the pickup head 109 is equal to a given fixed value. On the other hand, the transmission rate related to the recorded signal is variable. Therefore, the recorded signal is intermittently read out fromthe recording medium 112 in the case where the transmission rate related to the recorded signal is relatively low. The recorded signal is continuously read out from the recording medium 112 in the case where the transmission rate related to the recorded signal is high. The pickup head 109 outputs the read-out signal to the reproducing circuit 104 as a reproduced signal.

The reproducing circuit 104 processes the reproduced signal into a reproduced bit stream. The signal processing by the reproducing circuit 104 is inverse with respect to the signal processing by the recording circuit 103. The reproducing circuit 104 outputs the reproduced bit stream to the decoder 105.

The decoder 105 subjects the reproduced bit stream to a decoding process which is inverse with respect to the encoding process by the encoder 102. Accordingly, the decoder 105 reproduces an original video signal from the reproduced bit stream. The decoder 105 outputs the reproduced original video signal.

Figure 10:
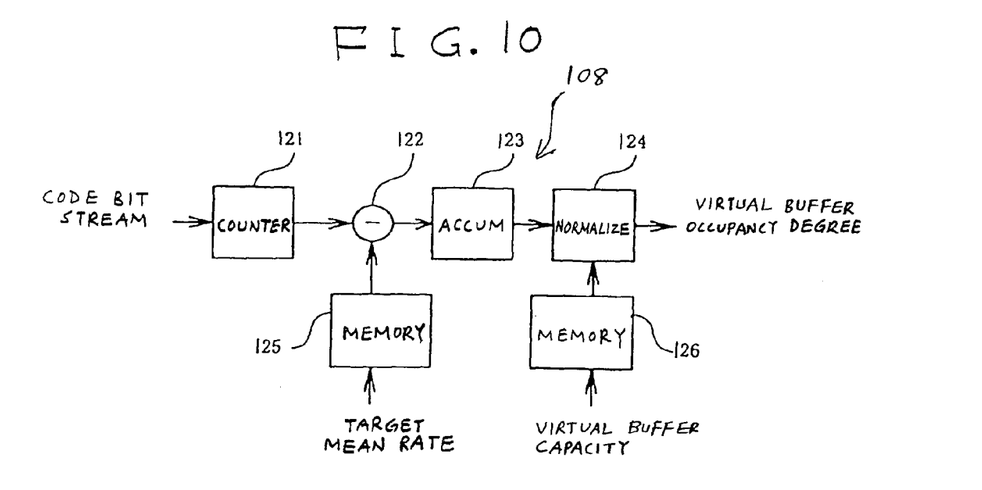
FIG. 10 is a block diagram of a virtual buffer in FIG. 8.

The virtual buffer 108 will be further explained. As shown in FIG. 10, the virtual buffer 108 includes a counter 121, a subtracter 122, an accumulator (an integrating adder) 123, a normalizing device 124, and memories 125 and 126. The counter 121 is connected between the encoder 102 (see FIG. 8) and the subtracter 122. The memory 125 is connected between the buffer controller 110 (see FIG. 8) and the subtracter 122. The subtracter 122 is connected to the accumulator 123. me accumulator 123 is connected to the normalizing device 124. The normalizing device 124 is connected to the quantization controller 107 (see FIG. 8). The memory 126 is connected between the buffer controller 110 (see FIG. 8) and the normalizing device 124

The counter 121 receives the bit stream from the encoder 102 (see FIG. 8). The device 121 counts every bit in the stream, thereby detecting the number of bits (the code amount) for every unit time, for example, every 1-frame-corresponding time. The counter 121 outputs a signal to the subtracter 122 which represents the detected code amount (the detected bit number) for every unit time. The memory 125 stores information of the target mean transmission rate which is fed from the buffer controller 110 (see FIG. 8). The information of the target mean transmission rate is outputted from the memory 125 to the subtracter 122. The target mean transmission rate decides a target code amount (a target number of bits) for every unit time. The device 122 subtracts the target code amount from the detected code amount. The subtracter 122 outputs a signal to the accumulator 123 which represents the subtraction-result code amount the error code amount).

The accumulator 123 integrates the subtraction-result code amount into a virtual-buffer remaining code amount. An initial value of the virtual-buffer remaining code amount is set to "0". The accumulator 123 outputs a signal to the normalizing device 124 which represents the virtual-buffer remaining code amount. The memory 126 stores information of the virtual-buffer capacity which is fed from the buffer controller 110 (see FIG. 8). The information of the virtual-buffer capacity is outputted from the meimory 126 to the normalizing device 126. The normalizing device 12,6 divides the virtual-buffer remaining code amount by the virtual-buffer capacity, and thereby normalizes the virtual-buffer remaining code amount into the virtual-buffer occupancy degree.

It should be noted that a greater virtual-buffer capacity may be used for a negative virtual-buffer occupancy degree.

As pieviously indicated, the information of the target mean transmission rate is fed to the memory 125 from the buffer controller 110. In addition, the information of the virtual-buffer capacity is fed to the memory 126 from the buffer controller 110. The target mean transmission rate and the virtual-buffer capacity used in the virtual buffer 108 can be updated by the buffer controller 110.

Figure 11:
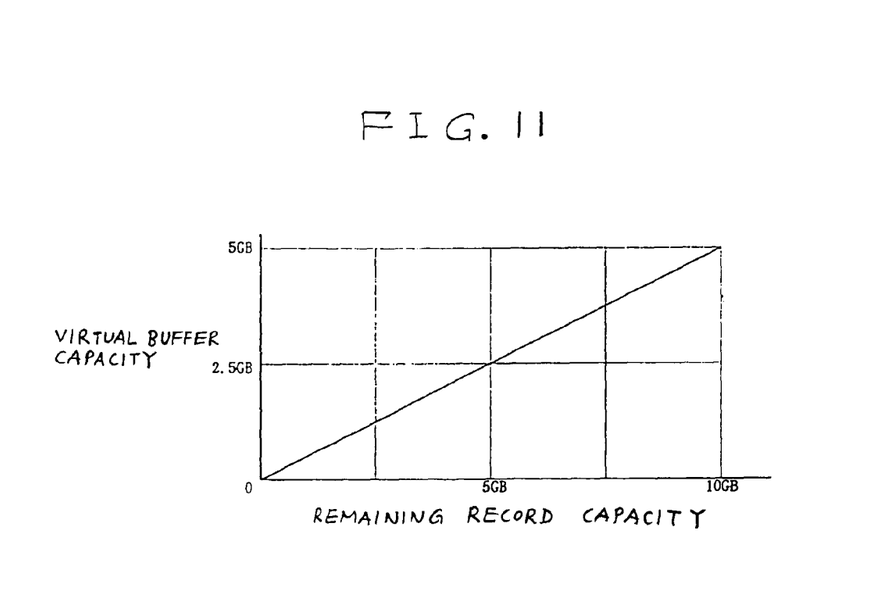
FIG. 11 is a diagram of the relation between a virtual-buffer capacity and a remaining record capacity.
Figure 12:
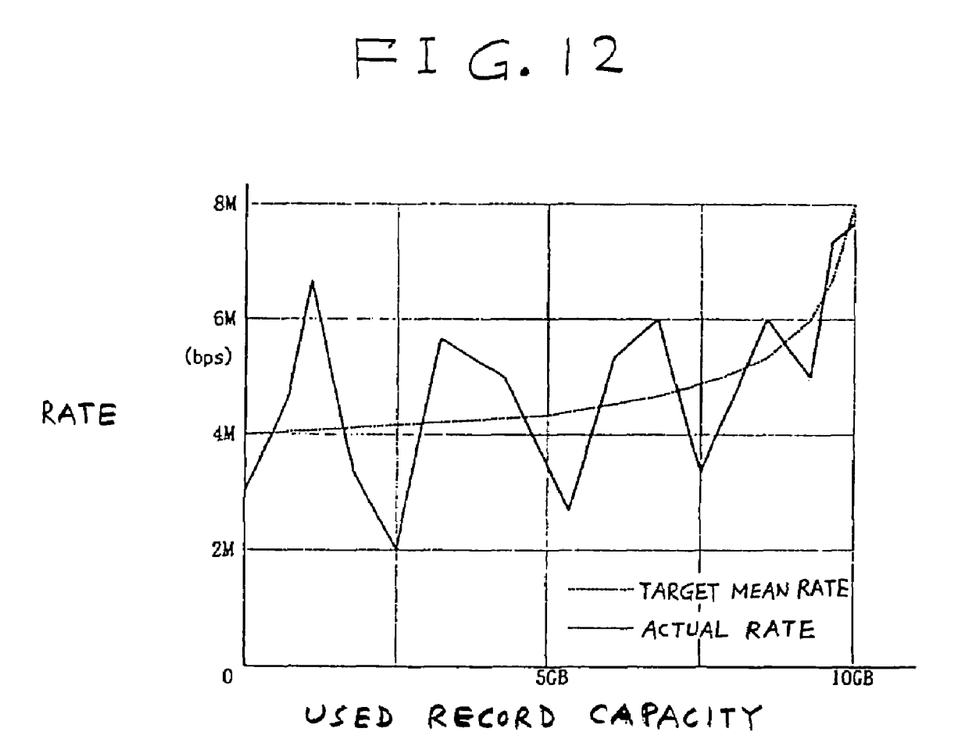
FIG. 12 is a diagram of the relations of a target mean transmission rate and an actual transmission rate to a used record capacity in the system of FIG. 8.

The virtual-buffer capacity is set by the buffer controller 110 as follows. The buffer controller 110 receives the information of the remaining record capacity of the recording medium 112 from the record position controller 111. The buffer controller 110 determines the virtual-buffer capacity in response to the remaining record capacity. As shown in FIG. 11, the virtual-buffer capacity is proportional to the remaining record capacity. Preferably, the virtual-buffer capacity is equal to about a half of the remaining record capacity. Accordingly, the buffer controller 110 includes a divider or a halving device which operates on the information of the remaining record capacity.

Since the virtual-buffer capacity is proportional to the remaining record capacity, a usable record capacity is always provided for a remaining record time (a remaining recording time) as long as the virtual buffer falls into neither an over-flow condition nor an under-flow condition. The magnitude of the usable record capacity is decided by the virtual-buffer occupancy degree.

In the case where the virtual-buffer capacity is set equal to the remaining record capacity multiplied by a value "A", conditions of the encoding are as follows. When the virtual-buffer occupancy degree is equal to "0", the actual code amount (the detected code amount) is equal to the target code amount. Thereafter, a usable record capacity remains which allows the encoding at a predetermined target mean rate. After the actual code amount is smaller than the target code amount and hence the virtual-buffer

What is claimed is:

1. A video signal encoding and recording apparatus comprising:
    first means for quantizing a video signal into a quantization-resultant signal in response to a variable quantization step;
    second means for recording the quantization-resultant signal generated by the first means on a recording medium;
    third means for calculating a remaining record capacity of the recording medium;
    fourth means for determining a capacity of a virtual buffer in response to the remaining record capacity calculated by the third means;
    fifth means for calculating a degree of occupancy of the virtual buffer having the capacity determined by the fourth means; and
    sixth means for controlling the quantization step used by the first means in response to the virtual-buffer occupancy degree calculated by the fifth means;
    wherein the fifth means comprises means for determining a target mean transmission rate in response to the remaining record capacity calculated by the third means, means for detecting a transmission rate of the quantization-resultant signal, and means for calculating the virtual-buffer occupancy degree in response to the target mean transmission rate, the detected transmission rate, and the virtual-buffer capacity determined by the fourth means.

2. A method of encoding and recording a video signal, comprising the steps of:
    quantizing a video signal into a quantization-resultant signal in response to a variable quantization step;
    recording the quantization-resultant signal on a recording medium;
    calculating a remaining record capacity of the recording medium;
    determining a capacity of a virtual buffer in response to the calculated remaining record capacity;
    calculating a degree of occupancy of the virtual buffer having the determined capacity; and
    controlling the quantization step in response to the calculated virtual-buffer occupancy degree;
    wherein the virtual-buffer occupancy degree calculating step comprises determining a target mean transmission rate in response to the calculated remaining record capacity, detecting a transmission rate of the quantization-resultant signal, and calculating the virtual-buffer occupancy degree in response to the target mean transmission rate, the detected transmission rate, and the determined virtual-buffer capacity.

* * * * *